United States Patent [19]

Brennan et al.

[11] Patent Number: 4,485,195

[45] Date of Patent: Nov. 27, 1984

[54] ALKOXYLATED MANNICH CONDENSATES HAVING FIRE RETARDANCY PROPERTIES AND MANUFACTURE OF RIGID POLYURETHANE FOAM THEREWITH

[75] Inventors: Michael E. Brennan; George P. Speranza, both of Austin, Tex.

[73] Assignee: Texaco Inc., White Plains, N.Y.

[21] Appl. No.: 545,423

[22] Filed: Oct. 25, 1983

[51] Int. Cl.³ .................. C08G 18/14; C08G 18/32
[52] U.S. Cl. ............................. 521/167; 252/182; 528/73
[58] Field of Search ............... 521/167; 528/73; 252/182

[56] References Cited

U.S. PATENT DOCUMENTS

| | | | |
|---|---|---|---|
| 3,297,597 | 1/1967 | Edwards et al. | 260/2.5 |
| 4,137,265 | 1/1979 | Edwards et al. | 260/570.9 |
| 4,221,875 | 9/1980 | Yukuta et al. | 521/128 |
| 4,317,889 | 3/1982 | Pcolinsky | 521/107 |
| 4,369,258 | 1/1983 | Johnson | 521/107 |

*Primary Examiner*—Herbert S. Cockeram
*Attorney, Agent, or Firm*—Jack H. Park; Kenneth R. Priem

[57] ABSTRACT

This invention relates to polyols that can be used to prepare rigid foams having improved fire retardancy properties, such polyols being prepared by alkoxylating with propylene oxide (which can contain some ethylene oxide) a reaction product prepared by heating a mixture of a Mannich condensate, a minor amount of melamine and 1 to 6 mols of formaldehyde, based on the melamine; the Mannich condensate having been prepared by reacting phenol or a $C_1$–$C_{12}$ alkylphenol with formaldehyde and diethanolamine in the mol ratios of from 1:1:1 to about 1:3:3.

12 Claims, No Drawings

ALKOXYLATED MANNICH CONDENSATES HAVING FIRE RETARDANCY PROPERTIES AND MANUFACTURE OF RIGID POLYURETHANE FOAM THEREWITH

BACKGROUND OF THE INVENTION

1. Technical Field of the Invention

This invention relates to Mannich condensates useful in the manufacture of rigid polyurethane foam. More particularly, this invention relates to modified Mannich condensates, to the manufacture from their propoxylation products, and to the synthesis therefrom of rigid polyurethane foams having improved fire retardancy properties. The invention is based upon the discovery that unique polyols are provided when melamine is reacted with formaldehyde in the presence of a particular class of Mannich condensates to provide a reaction product that is then alkoxylated with propylene oxide.

2. Prior Art

Johnson U.S. Pat. No. 4,369,258 is directed to polyurethane foams prepared by reacting a polyisocyanate with a mixture of a melamine polyol with a polyol derived from a polyester or a polyether polyol.

Yukuta et al. U.S. Pat. No. 4,221,875 is directed to rigid polyurethane foams having flame resistance which are prepared from a mixture comprising a polyhydroxy compound such as an ethylene oxide adduct of a material containing a plurality of hydroxyl groups such as sucrose or sorbitol, an organic polyisocyanate, a blowing agent and powdered melamine. From 20 to 60 parts by weight of powdered melamine per 100 parts of polyhydroxy compound are recommended.

Pcolinsky, Jr. U.S. Pat. No. 4,317,889 and the numerous U.S. patents cited therein disclose the use of melamine derivatives such as hydroxymethyl melamines, melamine phosphate, hexaalkoxymethylmelamine, etc. as a component for use in the manufacture of flexible polyurethane foams.

Edwards et al. U.S. Pat. No. 3,297,597 is directed to Mannich condensates of a phenolic compound, formaldehyde, and an alkanolamine which are then alkoxylated, preferably with propylene oxide, to provide polyols useful in the manufacture of rigid polyurethane foams.

Edwards et al. U.S. Pat. No. 4,137,265 is similarly directed to Mannich condensates prepared by reacting phenol with formaldehyde and diethanolamine which are then propoxylated and used in the manufacture of rigid polyurethane foam.

SUMMARY OF THE INVENTION

In one aspect, the present invention is directed to polyols prepared by alkoxylating a reaction product prepared by reacting melamine with formaldehyde in admixture with a particular class of Mannich condensates prepared from a phenol, formaldehyde and diethanolamine.

In another aspect of the present invention, a modified polyol based upon a Mannich condensate, as just described, is reacted with an organic polyisocyanate in the presence of a blowing agent, a catalyst, and other appropriate components, in order to manufacture a rigid polyurethane foam having improved fire retardancy properties.

DETAILED DESCRIPTION

The Modified Polyol

The principal components of the present invention are melamine, formaldehyde, a Mannich condensate of a phenol, formaldehyde and diethanolamine and propylene oxide. A minor amount of ethylene oxide may also be used, if desired.

The phenolic compound to be employed in accordance with the present invention is a phenol having a hydrogen atom on one or more of the ring positions ortho and para to the hydroxyl group and which is otherwise unsubstituted or substituted with a C1–C2 straight chain or branched chain alkyl group. Representative compounds include phenol, methylphenol, ethylphenol, propylphenyl, hexylphenol, nonylphenol, dodecylphenol, etc.

The phenolic compound is reacted with formaldehyde and diethanolamine to form a Mannich condensate. Formaldehyde may be employed in its conventional form, as an aqueous formalin solution, in "inhibited" methanol solution, as paraformaldehyde, or as trioxane.

For example, the Mannich reaction is conducted by premixing the phenolic compound with a desired amount of the diethanolamine and then slowly adding formaldehyde to the mixture at a temperature below the temperature of Novolak formation (a temperature that will vary with the phenolic compound employed and is a temperature of less than about 45° C. when phenol itself is employed).

At the end of the reaction, water is stripped from the reaction mixture to provide thereby a crude Mannich reaction product. Although it is within the scope of the present invention to separate the crude reaction product by conventional means into specific components or fractions, it is a feature of the present invention that the entire crude Mannich reaction product may be used as such without isolation of individual components thereof. In accordance with the preferred embodiment of the present invention, the entire crude Mannich reaction product is used.

In accordance with the present invention, from about 3 to about 10% by weight of melamine is mixed with a Mannich condensate as just described and then from about 1 to about 6 mols of formaldehyde, based on the melamine are reacted with this mixture at a temperature of about 80° to about 150° C. for about 1 to 5 hours to form a modified reaction product. This reaction product is then alkoxylated with propylene oxide or with propylene oxide and ethylene oxide. The alkylene oxide component may suitably comprise 100% to about 90% propylene oxide and 0 to about 20 wt.% ethylene oxide and may comprise about 20% to about 50% of the alkoxylation product.

The alkoxylation with propylene oxide is simply carried out by introducing the propylene oxide, preferably under pressure, into a vessel containing the modified Mannich reaction product. No added catalyst is needed since the basic nitrogen in this product provides sufficient catalytic activity to promote the reaction. Temperatures between about 30° C. and about 200° C. may be employed but the preferred temperatures are in the range of about 90° to 120° C. Under these conditions the phenolic hydroxyl group and the alkanol amino hydroxyls are reactive to form hydroxypropyl groups. The final condensation products are separated from unreacted and partially reacted materials by vacuum stripping and are obtained as clear amber to brown liquids having hydroxyl numbers in the range of 400 to 550 and viscosities between about 10,000 and 45,000 centipoises at 25° C.

The final condensation product is cooled and, if necessary, filtered to remove excess undissolved melamine.

MANUFACTURE OF RIGID POLYURETHANE FOAM

The physical components utilized for the manufacture of a rigid polyurethane foam are the polyols, an organic polyisocyanate, a blowing agent, a surfactant, a catalyst and suitable fire retardants and other additives.

The polyol component in the present invention comprises a modified propoxylated Mannich condensate as just described used alone or in admixture with from about 10 to about 60 parts by weight of a polyoxypropylene polyol having hydroxyl number between 200 and 800, preferably, between 300 and 700 and more preferably between about 400 and about 600, and a functionality of 2 to 6, and preferably from about 3 to 6.

Normally, propylene oxide will constitute from about 15 to about 95 wt.% of the total polyol composition, up to about 10 wt.% of ethylene oxide may be utilized if desired, based on the weight of the propylene oxide.

A wide variety of initiators may be alkoxylated to form useful polyoxypropylene polyols. Thus, for example, polyfunctional amines and alcohols of the following type may be alkoxylated: monoethanolamine, diethanolamine, triethanolamine, ethylene glycol, polyethylene glycol, propylene glycol, polypropylene glycol, glycerine, sorbitol, and trimethylolpropane.

Such above amines or alcohols may be reacted with an alkylene oxide such as ethylene oxide, propylene oxide, or mixed ethylene oxide and propylene oxide using techniques known to those skilled in the art. Thus, for example, the reaction of alkylene oxides with initiators of this type is set forth in U.S. Pat. Nos. 2,948,757 and 3,000,963. Essentially such alkoxylations are carried out in the presence of a basic catalyst at a temperature sufficient to sustain the reaction. The hydroxyl number which is desired for the finished polyol will determine the amount of alkylene oxide used to react with the initiator. The oxypropylene polyol may be prepared by reacting the initiator with propylene oxide or ethylene oxide, or by reacting the initiator first with propylene oxide followed by ethylene oxide or vice versa in one or more sequences to give a so-called block polymer chain or by reacting the initiator with a mixture of propylene oxide and ethylene oxide to achieve a random distribution of such alkylene oxides. As noted above, the polyoxypropylene polyols useful here have a hydroxyl number ranging from about 200 to about 800. The reaction mixture is then neutralized and water and excess reactants are stripped from the polyol.

Any aromatic polyisocyanate may be used in the practice of the instant invention. Typical aromatic polyisocyanates include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl) methane, bis(3-methyl-4-isocyanatophenyl) methane, and 4,4'-diphenylpropane diisocyanate.

Preferred aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents, for example, U.S. Pat. Nos. 2,683,730; 2,950,263; 3,012,008; 3,344,162; and 3,362,979.

The more preferred methylene-bridged polyphenyl polyisocyanate mixtures used here contain from about 20 to about 100 wt.% methylene diphenyl diisocyanate isomers with the remainder being polymethylene polyphenyl diisocyanates having higher functionalities and higher molecular weights. Typical of these are polyphenyl polyisocyanate mixtures containing about 20 to 100 wt.% methylene diphenyl diisocyanate isomers, of which 20 to about 95 wt.% thereof is the 4,4'-isomer with the remainder being polymethylene polyphenyl polyisocyanates of higher molecular weight and functionality that have an average functionality of from about 2.1 to about 3.5. The isocyanate mixtures are known materials and can be prepared, for example, by the process described in U.S. Pat. No. 3,362,979, issued Jan. 9, 1968 to Floyd E. Bentley.

In the production of rigid polyurethane foams in the practice of the invention, other known additives are necessary. One such constituent is the blowing agent. Some examples of such materials are trichloromonofluoromethane, dichlorodifluoromethane, dichloromonofluoromethane, 1,1-dichloro-1-fluoromethane, 1,1-difluoro-1,2,2-trichloroethane, chloropentafluoroethane, and the like. Other useful blowing agents including low-boiling hydrocarbons such as butane, pentane, hexane, cyclohexane, and the like. See U.S. Pat. No. 3,072,582, for example.

The catalysts which may be used to make the foams are well known. There are two general types of catalyst, tertiary amines and organo-metallic compounds. Examples of suitable tertiary amines, used either individually or in mixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in my invention are triethylenediamine, tetramethylethylenediamine, triethylamine, tripropylamine, tributylamine, triamylamine, pyridine, quinoline, dimethylpiperazine, dimethylhexahydroaniline, dimethylpiperazine, N-ethylmorpholine, dimethylaniline, nicotine, dimethylaminoethanol, tetramethylpropanediamine, and methyltriethylenediamine. Organo-metallic compounds useful as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc. Selection of the individual catalysts and proportions to use in the polyurethane reaction are well within the knowledge of those skilled in the art, and an amine and organo-metallic compound are often used together in the polyurethane reaction.

Conventional formulation ingredients are also employed, such as, for example, foam stabilizers also known as silicone oils or emulsifiers. The foam stabilizer may be an organic silane or siloxane. For example, compounds may be used having the formula:

$$RSi[O-(RSiO)_n-(oxyalkylene)_mR]_3$$

wherein R is an alkyl group containing from 1 to 4 carbon atoms; n is an integer of from 4 to 8; m is an integer of 20 to 40; and the oxyalkylene groups are derived from propylene oxide and ethylene oxide. See, for example, U.S. Pat. No. 3,194,773.

The flame retardancy of the polyurethane composition can be enhanced by using known fire retardants. Examples of suitable flame retardants are: tris(1,3-dichloropropyl)phosphate, tris(2,3-dibromopropyl)-phosphate, 2,2-bis(chloromethyl)-1,3 propylene bis[-di(2-chloroethyl)phosphate], tris(2-chloroethyl)phosphate, tris(2-chloropropyl)phosphate, bis(dichloropropyl)tribromopentyl phosphate, tetrakis(2-chloroethyl)ethylene diphosphate (sold by Olin Chemicals as THERMOLIN®101), FYROL®EFF (oligomeric chloroalkyl phosphate, sold by Stauffer Chemical Co.), tricresyl phosphate, cresyl diphenyl phosphate, chlorinated paraffin, and brominated paraffin. Halogenated phosphates are preferred flame retardants in the practice of this invention, especially tris(1,3-dichloropropyl)phosphate, tris(2-chloroethyl)phosphate, FYROL®EFF, and tetrakis(2-chloroethyl)ethylene disphosphate. Although a single flame retardant is preferred from the standpoint of simplicity of formulation, mixtures of two or more of the same type or of different types may be found to give improved performance in some cases, and such mixtures are included in the scope of this invention. The amount of flame retardant can be varied over a wide range of from about 20 to about 60 parts by weight per 100 parts by weight of polyol in the reaction mixture. It is preferred to use from about 20 to about 40 parts by weight.

The rigid polyurethane foams prepared here can be made in one step by reacting all the ingredients together at once (one-shot process) or the rigid foams can be made by the so-called "quasi-prepolymer method". In accordance with this method, a portion of the polyol component is reacted in the absence of a catalyst with the polyisocyanate component in proportion so as to provide from about 20 percent to about 40 percent of free isocyanato groups in the reaction product, based on the polyol. To prepare foam, the remaining portion of the polyol is added and the two components are allowed to react in the presence of a catalyst and other appropriate additives such as blowing agents, foam stabilizing agents, fire retardants, etc. The blowing agent, the foam stabilizing agent, the fire retardant, etc., may be added to either the prepolymer or remaining polyol, or both, prior to the mixing of the component, whereby at the end of the reaction a rigid polyurethane foam is provided.

SPECIFIC EXAMPLES

Example A

A. Incorporation of Soluble Polymethylol Melamine into Aromatic Amino Polyol Mannich Condensates (5474-09)

A 1-liter three-neck round bottom flask, equipped with a mechanical stirrer, thermometer and condenser, was charged with 500.0 g R-350-X (5031-72-13B or -12B; equimolar phenol (formaldehyde/diethanolamine, water stripped, no propylene oxide) or R-650-X (5327-12-4; 1:2:2 mols mononoylphenol (formaldehyde/diethanolamine, water stripped, no propylene oxide ) Mannich condensates and 27.0 g (0.2140 mol) melamine. To this well stirred slurry, there was rapidly added 37% formalin to correspond to one to six mols inclusive of formaldehyde per mol of melamine (range, 17.4 g to 104.2 g 37% formalin). The whole was then heated to 100° C. and held for 3.0 hrs. Some solids still remained at this point. Water was stripped at aspirator pressure (~25 mm) and 150° C. maximum and then liquid product recovered by hot filtration to remove solids. Product analyses follow:

| NB | R-350-X Cond. | 5474-51 | -16 | -09 | -26 | -52 | -53 |
|---|---|---|---|---|---|---|---|
| mols CH$_2$O/mol melamine | 0 | 1 | 2 | 3 | 4 | 5 | 6 |
| OH No. | 539 | 817 | 796 | 828 | 808 | 821 | 804 |
| Total amine, meq/g | — | 4.69 | 4.62 | 4.65 | 4.69 | 4.90 | 4.73 |
| % Nitrogen | 6.52 | 7.42 | 7.37 | 8.43 | 8.58 | 9.20 | 9.26 |
| % Water | — | 0.35 | 0.17 | 0.57 | 0.08 | 0.10 | 0.11 |
| Viscosity (210° F.), cs | — | 70.6 | 128 | 6359 | 734 | 2039 | 2241 |
| pH [10/1(MeOH/H$_2$O)] | — | 9.8 | 9.7 | 9.6 | 9.6 | 9.8 | 9.6 |

| NB | Cond. | 5474-57 | -18 | -12 | -28 | -58 | -59 |
|---|---|---|---|---|---|---|---|
| mols CH$_2$O/mol melamine | 0 | 1 | 2 | 3 | 4 | 5 | 6 |
| OH No. | 456 | 563 | 544 | 527 | 529 | 518 | 527 |
| Total amine, meq/g | — | 4.16 | 4.36 | 4.25 | 4.25 | 4.10 | 4.05 |
| % Nitrogen | 6.04 | 7.34 | 7.62 | 6.61 | 8.80 | 8.30 | 8.95 |
| % Water | — | 0.06 | 0.06 | 0.20 | 0.27 | 0.92 | 1.07 |
| Viscosity (210° F.), cs | — | 413 | 785 | 856 | 1107 | 858 | 1011 |
| pH [10/1(MeOH/H$_2$O)] | — | 9.8 | 9.7 | 9.7 | 9.5 | 9.4 | 9.5 |

B. Propoxylation of Polymethylol Melamine Modified Mannich Condensates

The modified condensates prepared in Example A were propoxylated (82.5 g or 99.4 ml PO/g of R-350-X condensate and 51.2 g or 61.6 ml PO/g of R-650-X condensate) at 100°–105° C. in an uncatalyzed reaction by a standard procedure well known to those skilled in the art. The resulting polymethylol melamine modified aromatic amino polyols analyzed as follows:

Modified R-650-X foams gave an increased heat distortion temperature and decreased tendency to burn.

| Precursor (Ex. A) | — | 5474-51 | -16 | -09 | -26 | -52 | -53 |
|---|---|---|---|---|---|---|---|
| Aromatic Amino Polyol | R-350-X | 5474-70-1 | -42-5 | -42-4 | -42-6 | -70-2 | -70-3 |
| OH No. | 534 | 514 | 497 | 512 | 504 | 500 | 476 |
| Total Amine, meq/g | 2.8 | 2.71 | 2.72 | 2.72 | 2.76 | 2.55 | 1.63 |
| % Nitrogen | 3.92 | 4.20 | 4.27 | 4.80 | 5.11 | 5.33 | 5.37 |
| Viscosity (25° C.), cs | 14,500 | 15,440 | 24,911 | 19,906 (100° F.) | — | 302 (210° F.) | 329 (210° F.) |
| % H$_2$O | 0.02 | 0.01 | 0.01 | 0.04 | 0.01 | 0.05 | 0.01 |
| Gardner color | — | 12-13 | 11 | 10-11 | 10-11 | 12 | 12-13 |
| pH [10/l(MeOH/H$_2$O)] | 11.2 | 11.1 | 11.7 | 11.7 | 11.8 | 11.6 | 11.7 |

| Precursor (Ex. A) | — | 5474-71-1 | -18 | -12 | -28 | -59 |
|---|---|---|---|---|---|---|
| Aromatic Amino Polyol | R-650-X | 5474-71-1 | -63-5 | -63-4 | -63-6 | -71-3 |
| OH No. | 455 | 403 | 373 | 392 | 376 | 409 |
| Total Amine, meq/g | 3.00 | 2.87 | 2.79 | 3.22 | 2.84 | 2.91 |
| % Nitrogen | 4.20 | 4.94 | 5.53 | 6.20 | 6.03 | 6.09 |
| Viscosity (25° C.), cs | 28,000 | 61,788 | 94,189 | 144,366 | 147,376 | 43,969 (100° F.) |
| % H$_2$O | 0.02 | 0.01 | 0.01 | 0.01 | 0.26 | 0.02 |
| Gardner color | — | 13-14 | 16 | 15 | 16-17 | >18 |
| pH [10/l(MeOH/H$_2$O)] | 10.6 | 11.1 | 11.2 | 11.5 | 11.1 | 11.1 |

C. Rigid Polyurethane Foams (5474-65)

Rigid polyurethane foams were prepared from R-350-X and R-650-X standards and selected polymethylol melamine modified aromatic amino polyols listed in Ex. B. The formulation components were mixed at 2700 rpm and poured into an 8"×8"×12" open mold and allowed to rise. The resulting foams were allowed to stand at room temperature for 3 days before testing. Formulations and foam physical properties are listed below.

| Formulation, pbw | 5474-35-1 | 77-4 | 65-6 | 66-1 | 73-5 | 73-4 | 73-6 |
|---|---|---|---|---|---|---|---|
| R-350-X (OH = 534) | 36.0 | — | — | — | — | — | — |
| 5474-70-1 (OH = 514) | — | 36.8 | — | — | — | — | — |
| -42-5 (OH = 497) | — | — | 37.5 | — | — | — | — |
| R-650-X (OH = 455) | — | — | — | 39.4 | — | — | — |
| 5474-63-5 (OH = 373) | — | — | — | — | 43.7 | — | — |
| -4 (OH = 392) | — | — | — | — | — | 42.6 | — |
| -6 (OH = 376) | — | — | — | — | — | — | 43.5 |
| Silicone DC-183 | 0.5 | → | → | → | → | → | → |
| Freon R-11B | 13.0 | → | → | → | → | → | → |
| Mondur MR (index = 1.10) | 50.5 | 49.7 | 49.0 | 47.1 | 42.8 | 43.9 | 43.0 |
| Times (sec), Mixing | 15 | 12 | 14 | 12 | 8 | 6 | 8 |
| Cream | 26 | 17 | 18 | 17 | 12 | 8 | 12 |
| Gel | 104 | 50 | 60 | 57 | 29 | 29 | 26 |
| Tack Free | 134 | 66 | 66 | 62 | 34 | 31 | 30 |
| Rise | 141 | 96 | 98 | 99 | 64 | 55 | 75 |
| Initial Surface Friability | none | → | → | → | → | → | → |
| Foam Apprarance | good | → | → | → | → | → | → |
| Physical Properties | | | | | | | |
| Density, lbs/ft$^3$ | 2.05 | 1.94 | 2.05 | 2.13 | 2.29 | 2.23 | 2.33 |
| K-Factor | 0.122 | 0.111 | 0.112 | 0.115 | 0.123 | 0.116 | 0.121 |
| Comp. Str. (psi), w rise | 48.89 | 47.77 | 51.48 | 47.86 | 28.78 | 38.44 | 41.48 |
| x̄ rise | 16.17 | 19.22 | 20.79 | 16.25 | 24.83 | 24.23 | 23.31 |
| % Closed Cells | 92.3 | 94.4 | 92.9 | 93.2 | 91.8 | 93.7 | 92.2 |
| Friability (% wt loss, 10 min) | 3.9 | 4.6 | 3.3 | 3.5 | 8.5 | 3.9 | 5.4 |
| Heat Distortion, °C. | 171 | 170 | 147 | 155 | 168 | 168 | 163 |
| ASTM 1692 Burn, in/min (BHA) | 2.124 | 2.868 | 2.904 | 2.970 | 2.262 | 2.346 | 2.916 |

Polymethylol melamine modified R-350-X foams gave better K-factors and improved compressive strength. A faster reaction profile was also observed.

Reaction profiles were also faster.

EXAMPLE B

A. Incorporation of Soluble Polymethylol Melamine into Aromatic Amino Polyols (5474-11)

Preparation was identical to Example A employing 500.0 g THANOL®R-350-X (lot 1A-410, OH No.=534) or R-650-X (lot OV-408, OH No.=455), 27.0 g (0.2140 mol) melamine and 17.4 g to 104.2 g 37% formalin. Mol ratio of formaldehyde to melamine was 1-6. Homogeneous reaction products were obtained in all cases except the mol ratio 1 and 2 experiments. Product analyses follows:

| NB | R-350-X | 5474-54 | 17 | 11 | 27 | 55 | 56 |
|---|---|---|---|---|---|---|---|
| mols CH₂O/mol melamine | 0 | 1 | 2 | 3 | 4 | 5 | 6 |
| OH No. | 534 | 516 | 496 | 502 | 498 | 482 | 498 |
| Total Amine, meq/g | 2.8 | 3.00 | 3.05 | 3.11 | 3.10 | 3.02 | 3.07 |
| % Nitrogen | 3.92 | 5.73 | 6.83 | 7.11 | 7.00 | 6.98 | 7.14 |
| % Water | 0.02 | 0.10 | 0.33 | 0.25 | 0.02 | 0.94 | 0.57 |
| Viscosity (25° C.), cs | 14,500 | 32,071 | 52,792 | 110,215 | 74,526 | 82,471 | 100,511 |
| Gardner color | — | 6-7 | 4-5 | 6-7 | ~4 | 4 | 4 |
| pH [10/1(MeOH/H₂O)] | 11.2 | 11.2 | 10.4 | 10.5 | 10.2 | 10.3 | 10.5 |

| NB | R-650-X | 5474-60 | 19 | 13 | 29 | 61 | 62 |
|---|---|---|---|---|---|---|---|
| mols/CH₂O/mol melamine | 0 | 1 | 2 | 3 | 4 | 5 | 6 |
| ON No. | 455 | 444 | 432 | 428 | 420 | 440 | 414 |
| Total Amine, meq/g | 3.00 | 3.13 | 3.24 | 3.22 | 3.24 | 3.22 | 3.28 |
| % Nitrogen | 4.20 | 6.17 | 7.37 | 7.43 | 7.24 | 7.30 | 7.24 |
| % Water | 0.02 | 0.25 | 0.01 | 0.09 | 0.11 | 0.10 | 1.13 |
| Viscosity (25° C.), cs | 28,000 | 61,907 | 183,788 | 306,558 | — | 495 (210° F.) | 492 (210° F.) |
| Gardner color | — | ~15 | ~15 | ~16 | 13-14 | ~13 | ~14 |
| pH [10/1(MeOH/H₂O)] | 10.6 | 9.9 | 10.0 | 10.1 | 9.9 | 9.7 | 9.8 |

B. Rigid Polyurethane Foams (5474-36)

Rigid polyurethane foams were prepared from R-350-X and R-650-X standards and selected polymethylol melamine modified aromatic amino polyols listed in Ex. B. The formulation components were mixed at 2700 rpm and poured into an 8"×8"×12" open mold and allowed to rise. The resulting foams were allowed to stand at room temperature for 3 days before testing. Formulations and foam physical properties are listed below.

| Formulation, pbw | 5474-35-1 | 77-1 | 65-1 | 66-1 | 66-4 | 66-3 |
|---|---|---|---|---|---|---|
| R-350-X (OH = 534) | 36.0 | — | — | — | — | — |
| 5474-54 (OH = 516) | — | 36.7 | — | — | — | — |
| -27 (OH = 498) | — | — | 37.5 | — | — | — |
| R-650-X (OH = 455) | — | — | — | 39.4 | — | — |
| 5474-19 (OH = 432) | — | — | — | — | 40.5 | — |
| -13 (OH = 428) | — | — | — | — | — | 40.7 |
| Silicone DC-193 | 0.5 | → | → | → | → | → |
| Freon R-11B | 13.0 | → | → | → | → | → |
| Mondur MR (index = 1.10) | 50.5 | 49.8 | 49.0 | 47.1 | 46.0 | 45.8 |
| Time (sec), Mixing | 15 | 12 | 15 | 12 | 10 | 12 |
| Cream | 26 | 17 | 24 | 17 | 15 | 17 |
| Gel | 104 | 52 | 60 | 57 | 39 | 42 |
| Tack Free | 134 | 59 | 69 | 62 | 44 | 50 |
| Rise | 141 | 103 | 94 | 99 | 76 | 112 |
| Initial Surface Friability | none | → | → | → | → | → |
| Foam Appearance | good | → | → | → | → | → |
| Physical Properties | | | | | | |
| Density, lbs/ft³ | 2.05 | 1.96 | 1.74 | 2.13 | 2.12 | 2.25 |
| K-Factor | 0.122 | 0.117 | 0.127 | 0.115 | 0.112 | 0.113 |
| Comp. Str. (psi), w rise | 48.89 | 37.35 | 31.30 | 47.86 | 44.57 | 44.31 |
| x̄ rise | 16.17 | 20.23 | 10.13 | 16.25 | 15.32 | 13.64 |
| Heat Distortion, °C. | 171 | 158 | 168 | 155 | 180 | 171 |
| % Closed Cells | 92.3 | 94.1 | 89.0 | 93.2 | 93.5 | 93.7 |
| Friability (% wt loss, 10 min) | 3.9 | 1.9 | 6.1 | 3.5 | 3.0 | 3.0 |
| ASTM 1692 Burn, in/min (BHA) | 2.124 | 2.802 | 3.210 | 2.970 | 2.700 | 2.664 |
| Butler chimney Test | | | | | | |
| Flame height, in. | >11 | >11 | >11 | >11 | >11 | >11 |
| Sec. to extinguish | 20 | 28 | 28 | 36 | 30 | 23 |
| % wt. retained | 60.0 | 36.3 | 39.2 | 26.7 | 46.3 | 59.7 |

Polymethylol melamine modified R-350-X foams gave faster reaction profiles and in certain cases lower K-factors and less friability.

Modified R-650-X foams gave faster reaction profiles, lower K-factors, higher heat distortion temperatures, lower friability and a decreased tendency to burn.

It will be understood that the foregoing examples are given by way of illustration only and not by way of limitation and that the scope of the present invention is defined solely by the appended claims.

What is claimed is:

1. A polyol composition prepared by reacting from 90 to 100 wt.% of propylene oxide and 0 to 10 wt.% of ethylene oxide with a reaction product prepared by heating a mixture of a Mannich condensate, from about 3 to 10 wt.% of melamine, based on the Mannich condensate, and about 1 to 6 mols of formaldehyde, based on the melamine at about 80° to about 150° C. for about 1 to about 5 hours, said Mannich condensate having been prepared by reacting about 1 to about 3 mols of formaldehyde and about 1 to about 3 mols of diethanolamine per mol of a phenolic compound selected from the group consisting of phenol and phenol substituted with an alkyl group containing 1 to 12 carbon atoms.

2. A polyol composition as in claim 1 wherein the Mannich condensate is a condensate of equimolar amounts of phenol, formaldehyde and diethanolamine, wherein propylene oxide consitutes from about 20 to about 50 wt.% of the polyol composition and wherein the polyol composition has a hydroxyl number within the range of about 500 to about 650.

3. A composition as in claim 1 wherein the Mannich condensate is a condensate of nonylphenol, formaldehyde and diethanolamine reacted in the molar ratio of about 2 mols of formaldehyde and 2 mols of diethanolamine per mol of nonylphenol, wherein the propylene oxide constitutes from about 20 to about 40 wt.% of the composition and wherein the composition has a hydroxyl number within the range of about 400 to about 500.

4. A method of preparing a polyol composition which comprises preparing a Mannich condensate of a phenolic component with formaldehyde and diethanolamine by reacting said phenolic component with formaldehyde and diethanolamine in the molar ratio of about 1 to about 3 mols of formaldehyde and from about 1 to about 3 mols of diethanolamine per mol of said phenolic component, while removing by product water of reaction, slurrying from about 3 to about 10 wt.% of melamine with said thus prepared Mannich condensate, adding about 1 to about 6 mols of formaldehyde based on the melamine and heating said slurry at a temperature within the range of about 80° to about 150° C. for about 1 to 5 hours, filtering said thus prepared reaction product and thereafter reacting said reaction product with from about 20 to about 50 wt.% of an alkylene oxide component comprising from 100 to about 90 wt.% of propylene oxide and from 0 to about 10 wt.% of ethylene oxide, said phenolic component comprising phenol or an alkylphenol having an alkyl group containing 1 to 12 carbon atoms.

5. A method as in claim 4 wherein the Mannich condensate is prepared by reacting equimolar amounts of formaldehyde and diethanolamine with phenol.

6. A method as in claim 4 wherein the Mannich condensate is prepared by reacting nonylphenol with formaldehyde and diethanolamine in the ratio of about 2 mols formaldehyde and about 2 mols of diethanolamine per mol of nonylphenol.

7. A method of preparing a rigid polyurethane foam composition having improved fire retardancy properties which comprises:

reacting an excess of an aromatic polyisocyanate with a polyol component in the presence of a catalyst, a blowing agent, a surfactant and a fire retardant;

said polyol component having been prepared by heating a mixture of a Mannich condensate, from about 3 to about 10 wt.% of melamine, based on said condensate, and from about 1 to about 6 mols of formaldehyde per mol of melamine at about 80° to about 150° C. for about 1 to about 5 hours to prepare a reaction product and, alkoxylating said reaction product with from about 20 to about 50 wt.% of an alkylene oxide component comprising 100 to about 90 wt.% of propylene oxide and, correspondingly, from about 0 to about 10 wt.% of ethylene oxide to prepare said polyol component;

said Mannich condensate having been prepared by reacting a phenolic component with about 1 to about 3 mols of formaldehyde and about 1 to about 3 mols of diethanolamine per mol of a said phenolic component, said phenolic component being selected from the group consisting of phenol and phenol substituted with an alkyl group containing 1 to 12 carbon atoms.

8. A method as in claim 7 wherein the Mannich condensate is the sole polyol component, and wherein said Mannich condensate is a condensate of phenol, formaldehyde and diethanolamine in equimolar proportions.

9. A method as in claim 7 wherein the Mannich condensate is a condensate of nonylphenol, formaldehyde and diethanolamine in the molar ratio of about 2 mols of formaldehyde and 2 mols of diethanolamine per mol of nonylphenol.

10. A polyurethane composition prepared by reacting an excess of an aromatic polyisocyanate with a polyol component in the presence of a catalyst, a blowing agent, a surfactant and a fire retardant;

said polyol component comprising a Mannich condensate polyol component having a hydroxyl number of about 400 to about 550 or a mixture of about 90 to about 40 parts by weight of said Mannich condensate polyol component with, correspondingly, from about 10 to about 60 parts by weight of a polyoxypropylene polyol component having a hydroxyl number of about 200 to about 800 and a functionality of 2 to 6;

said polyoxypropylene polyol comprising an initiator and from about 15 to about 95 wt.% of an alkylene oxide component;

said Mannich condensate polyol component having been prepared by reacting an alkylene oxide component with a reaction product;

said reaction product having been prepared by heating a mixture of a Mannich condensate, from about 3 to about 10 wt.% of melamine, based on said condensate, and from about 1 to about 6 mols of formaldehyde per mol of melamine at about 80° to about 150° C. for about 1 to about 5 hours;

said alkylene oxide component comprising 100 to about 90 wt.% of propylene oxide and, correspondingly, from about 0 to about 10 wt.% of ethylene oxide;

said Mannich condensate having been prepared by reacting a phenolic component with about 1 to about 3 mols of formaldehyde and about 1 to about 3 mols of diethanolamine per mol of a said phenolic component, said phenolic component being selected from the group consisting of phenol and phenol substituted with an alkyl group containing 1 to 12 carbon atoms.

11. A polyurethane composition as in claim 10 wherein the Mannich condensate polyol component is the sole polyol component and wherein said Mannich condensate is a condensate of phenol, formaldehyde and diethanolamine reacted in equimolar proportions.

12. A polyurethane composition as in claim 10 wherein the Mannich condensate polyol component is the sole polyol component and wherein the Mannich condensate is a condensate of nonylphenol, formaldehyde and diethanolamine reacted in the molar ratio of about 2 mols of formaldehyde and about 2 mols of diethanolamine per mol of nonylphenol.

* * * * *